March 5, 1935.  H. L. SMITH, JR., ET AL  1,993,288
HEATING AND COOLING SYSTEM
Filed Oct. 2, 1933   2 Sheets-Sheet 2
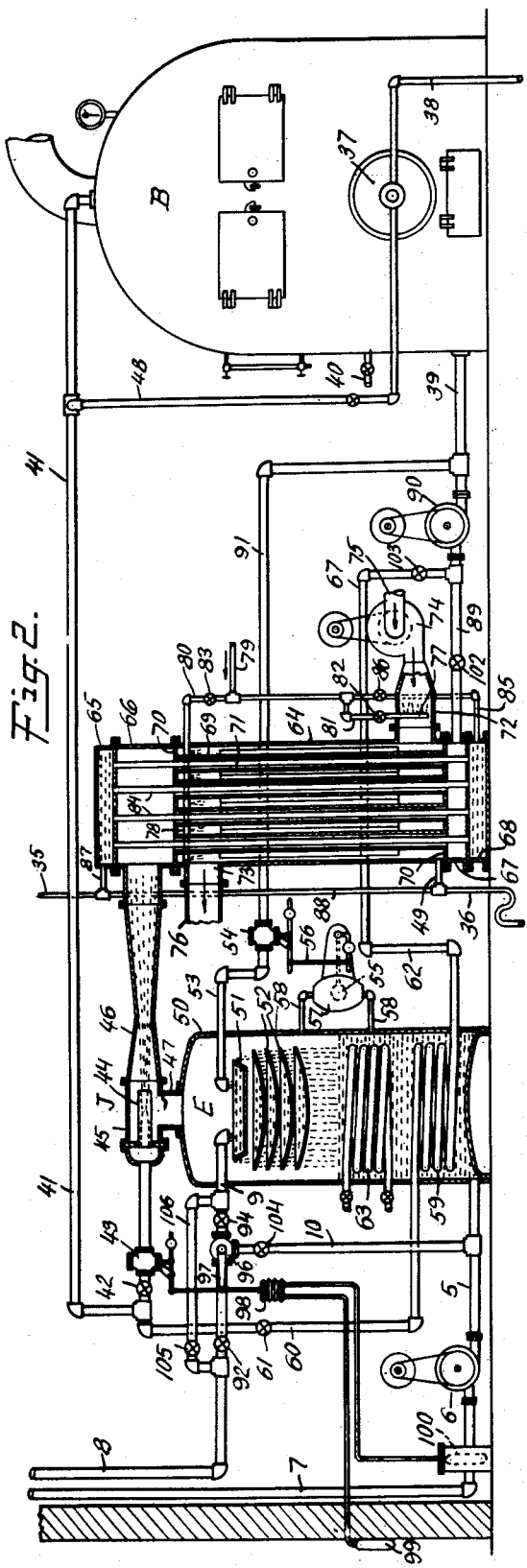
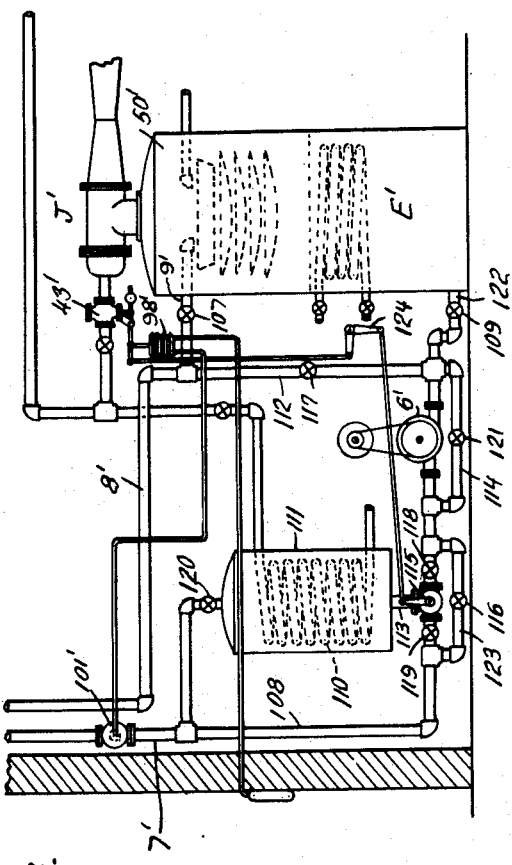
INVENTORS
Horace L. Smith Jr.
Lucian N. Jones
BY
Pennie, Davis, Marvin & Edmonds
ATTORNEYS Patented Mar. 5, 1935

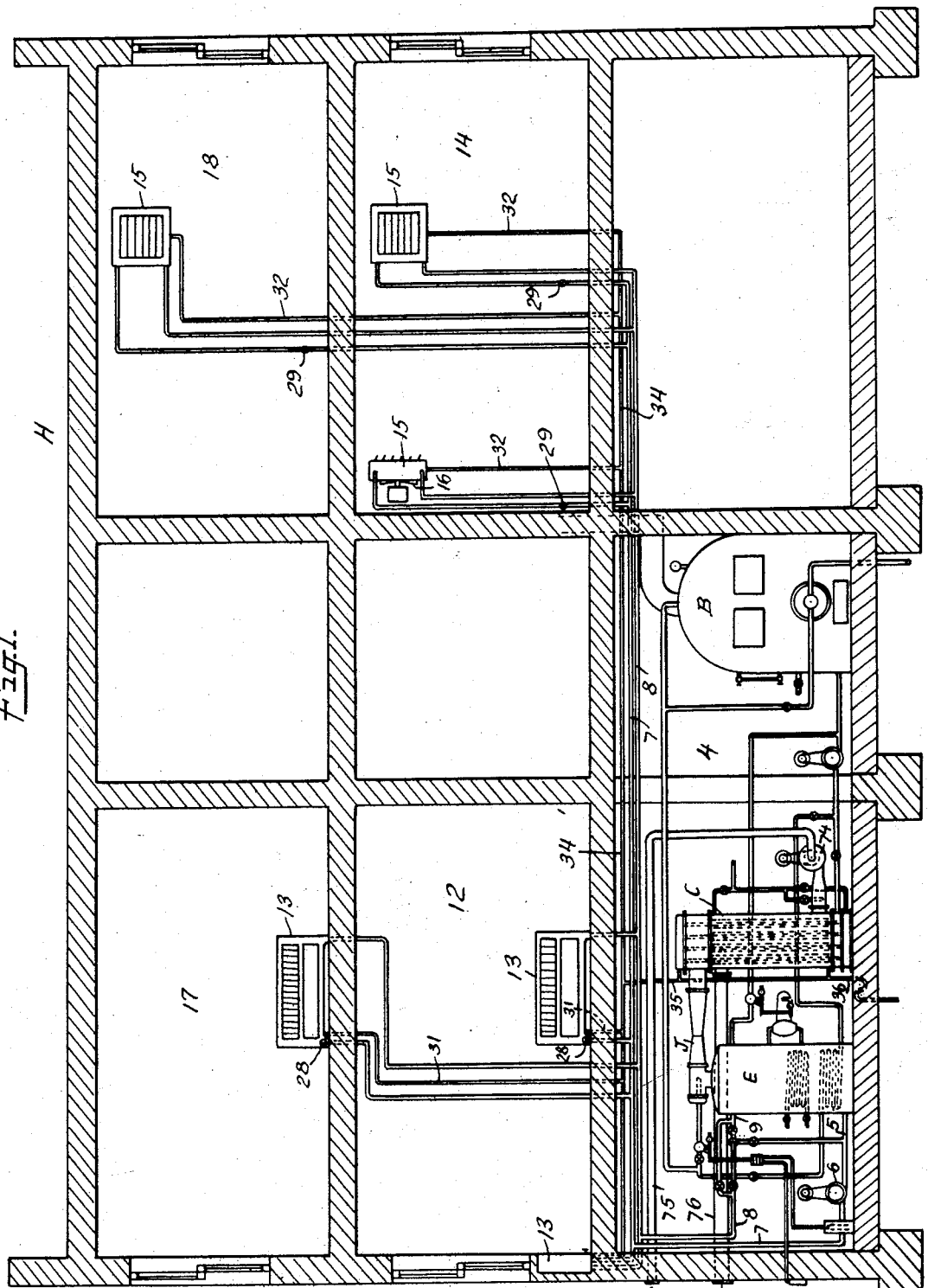

1,993,288

UNITED STATES PATENT OFFICE 1,993,288

HEATING AND COOLING SYSTEM

Horace L. Smith, Jr., and Lucian N. Jones, Richmond, Va., assignors to Thermal Engineering Corporation, Richmond, Va., a corporation of Virginia Application October 2, 1933, Serial No. 691,780

6 Claims. (Cl. 257—8)

This invention relates to the control of air temperature and more particularly concerns a system for heating and cooling the air in the rooms of building enclosures.

In most existing buildings, the only air temperature regulating means provided comprises heating apparatus for use when the outside air temperature is below that required for comfort. Obviously, comfortable indoor temperatures cannot be maintained under varying outdoor weather conditions by heating alone, and various air cooling systems and devices have been proposed, and to a small extent, installed in buildings. These proposed systems customarily employ compression type refrigerating machines which are quite expensive both in initial cost and operation. Perhaps the most unfavorable aspect of known cooling systems, and the factor which more than any other has prevented their general adoption, is the fact that a large investment must be tied up in refrigerating equipment which is operated only during a relatively short proportion of the time.

With the above and other considerations in mind, it is proposed, in accordance with the present invention, to provide a simplified system for heating and cooling the air in rooms or buildings, which system is comparatively inexpensive to install and operate and is so designed that the major portion of the equipment representing the investment involved is operated throughout the year. The invention further includes improved control means for regulating the operation of the system under both heating and cooling conditions.

In general, our improved system comprises a closed water circuit of the type commonly used in hot water heating systems and including suitable radiators or equivalent heat exchange means connected therein and disposed in the rooms or other enclosures of the building, together with a source of steam, such as a generator or boiler, and means for economically utilizing the steam from the source to either heat or cool the circulated water. The heating of the water may be economically effected by direct heat exchange between the steam and the water. As a means for utilizing the steam to effect the cooling of the circulating water in the circuit, we prefer to employ an evaporator in which a vacuum is maintained by a steam ejector, and in which the water from the circuit is caused to boil or evaporate and so absorb heat. By properly designing the steam ejector, the vacuum created in the evaporator may be maintained at such a value that when water returned from the water circuit is sprayed therein, this water boils and thus absorbs heat from the water itself. The ejector carries off the steam or water vapor evolved in the evaporator, and the exhaust steam from the ejector together with the vapor withdrawn from the evaporator is condensed and returned to the steam boiler and the water circuit as conditions may require.

In the improved system generally described above, the elements of the equipment representing the major portion of the total investment are utilized in the cooling operation as well as in the heating operation. Thus the water circulating system, radiators and boiler or other steam source are in service whenever heating or cooling is required. In one form of our invention, the container comprising the evaporator is alternately employed as a water heating container which results in a further saving in capital investment.

We prefer to employ a control means jointly responsive to both the outside air temperature and the temperature of the water being circulated for governing the degree of both heating and cooling produced by our system. Our improved control system is so designed that a rise in the outdoor temperature or a resultant rise in water temperature acts, within a predetermined range of outdoor temperatures, to cut down the amount of steam supplied to the water heating means, and acts, within another and higher range of outdoor temperatures, to increase the amount of heat supplied to the water cooling means. At the same time, the control of the steam flow jointly by both the outdoor temperature and the temperature of the water in the circuit prevents undesirable fluctuations in the temperature of the rooms being heated or cooled.

The various features and advantages of our improved system will be best understood by reference to the accompanying drawings in which certain embodiments of the invention have been disclosed. In the drawings;

Figure 1 is a simplified representation of a system embodying our invention as installed in a building;

Figure 2 is an elevation, on a larger scale, of the water heating and cooling apparatus disclosed in the system of Figure 1; and Figure 3 is an elevation of a modified from of the apparatus disclosed in Figure 2.

Referring to the drawings, and particularly to Figures 1 and 2, we have disclosed our improved system as installed in a building H having a basement or other suitable room 4 in which the heating and cooling apparatus is located. This apparatus is shown on an enlarged scale in Figure 2 and will be hereafter described more in detail. In general, the apparatus comprises a steam generator or boiler B, an evaporator E, an ejector J and a condenser C.

A closed water circuit or system connects the heating and cooling apparatus with suitable heat exchange devices or radiators located in the rooms of the building H. In general, this circulating system may be of the type generally amployed in hot water heating systems for buildings. Various different types of direct and indirect heat exchange devices may be used in connection with this water circulating system, and in the accompanying drawings, we have shown by way of illustration two different types of such heat exchangers applied to different rooms in the building. As shown in Figure 1, the water circulating system includes a supply line comprising a pipe 5 which conducts water from the tank of the evaporator E to a circulating pump 6 and a pipe 7, which conducts the water from the pump to the various heat exchange devices or radiators located in the rooms of the building. A return pipe 8 conducts the water from the heat exchange devices back to the device of the evaporator E through a pipe 9, and a valve controlled by-pass pipe 10 connects the pipes 8 and 5 adjacent the evaporator.

As shown in the drawings, the rooms 12 and 17 in the building H are provided with radiator type heat exchangers 13. These devices may each comprise a plurality of finned tubes or ducts connected between the supply and return pipes of the water circuit and enclosed within a grilled cabinet which may or may not be provided with an air circulating fan. The rooms 14 and 18 are provided with heat exchangers 15 of the type generally known as unit heaters or unit coolers, these devices comprising suitable radiator type passages for the circulating water and power driven fans 16 for forcing air circulation through the radiators. Various other types of hot water radiators or heat exchangers may be employed in the water circuit of our system.

The heat exchange elements of the heat exchangers 13 and 15 are connected in the water circulating system between the supply and return pipes 7 and 8, as shown, and suitable valve means 28 and 29 are provided in the supply pipes leading to these heat exchange elements so that the flow of heating or cooling water therethrough may be regulated to suit the requirements of each room. Provision is preferably made for the collection of the moisture which condenses on the coils or radiating surfaces of the various heat exchange units when the air is being cooled, and drain pipes 31 and 32 have been shown for carrying such moisture from the several units through the pipes 34 and 35 to a drain 36.

Referring now more particularly to the water cooling and heating apparatus as shown in Figure 2, the steam used is preferably supplied by a generator or boiler B, which may be of any known construction suitable for use in steam heating plants. The steam may in some cases be supplied through suitable mains from a source remote from the building, such as a central steam supply plant. In the illustrated embodiment, the boiler B is provided with an oil burner conventionally illustrated at 37, with an oil supply pipe 38 and a steam supply pipe 48. Water condensed in the condenser C may be fed to the boiler B through the pipe 39 and make-up water may be supplied as needed through the valved pipe 40.

The steam generated in the boiler B is conducted through a pipe 41, a cut-off valve 42 and a throttle valve 43 to the nozzle 44 of ejector J connected with the tank of the evaporator E. The ejector may be of known construction and as shown, comprises a shell 45 surrounding the nozzle 44 and a properly shaped Venturi tube 46 opening into the shell and aligned with the outlet end of the nozzle 44. A duct 47 connects the ejector shell 45 with the evaporator tank E. With the construction shown, when steam is supplied to the nozzle 44, it emerges therefrom in a rapidly moving jet which, in passing through the Venturi tube 46, draws with it air or gas from the interior of the shell 45 through the duct 47. In this manner, the ejector J maintains a comparatively high vacuum within the tank of the evaporator E.

The evaporator E comprises a vertical tank or container 50 having a top opening connected with the ejector suction duct 47, as explained above. The return pipe 9 from the water circulating system enters the container 50 adjacent the upper end thereof and empties into the interior of the container. Suitable means are provided for breaking up the water entering the container 50 into a spray, and in the illustrated embodiment, this is accomplished by means of a distributing pan 51 and a plurality of perforated dished plates 52. Water from the pipe 9 fills the pan 51 and flows over the edges thereof on to the plates 52, falling from the perforations in these plates in the form of a spray. Additional water from the condenser C is supplied as needed to the distributing pan 51 of the evaporator through the pipe 53.

The evaporator container 50 is kept substantially half full of water and the water level may be kept constant by a valve 54 in the condensed water supply pipe 53, which valve is operated by a float 55 through a suitable linkage 56. As shown, the float 55 is disposed in a container 57 connected to the evaporator tank 50 through the pipes 58, although obviously other arrangements could be employed. The condensed water supplied to the evaporator container 50 through the pipe 53 makes up for or replaces the water lost therefrom in the form of steam or vapor drawn off by the ejector J.

In the embodiment of Figure 2, a heating coil 59 is provided within the evaporator tank 50 adjacent the lower end thereof. Steam may be supplied to this coil through the pipe 60 connected to the pipe 41, the steam flow being controlled by a valve 61. Condensed steam from the coil 59 is returned to the boiler supply pipe 39 through the pipe 62. If desired, a drinking water cooling coil may be located within the evaporator container 50 below the water level therein and such a coil has been shown at 63.

Various forms of steam condensing apparatus may be employed in connection with our system, and in the disclosed embodiment, we have illustrated an improved condenser C which acts to liquefy the exhaust steam and vapor from the ejector J. The condenser C comprises generally a shell 64 having a water header 65 and a steam header 66 at the upper end thereof, and a condensate header 67 and water header 68 at the lower end thereof. A plurality of spaced parallel tubes 69 pass vertically through the shell 64, being sealed in tube sheets 70 at the opposite ends of the shell so as to connect the steam and condensate headers 66 and 67. Suitable fins 71 are preferably provided on the tubes 69. An air inlet duct 72 is connected to the shell 64 adjacent its lower end, and an air outlet duct 73 conducts air from the interior of the shell near its upper end. Cooling air may be forced through the shell 64 around the finned tubes 69 by suitable means, such as a motor driven blower 74, and air for this purpose may be delivered to the blower through a duct 75 connected with the outside atmosphere, as shown in Figure 1. Similarly, the air outlet duct 73 of the condenser is preferably connected by a duct 76 to a point outside the building. We prefer to cool the air delivered to the condenser by introducing a water spray thereto, and a spray pipe 77 has been shown in the air inlet duct 72 for this purpose. An additional set of water sprays 78 is preferably provided within and at the upper end of the shell 64 between the tubes 69. Water for the sprays 77 and 78 may be supplied from any suitable source through the pipes 79, 80 and 81 under the control of the valves 82 and 83.

Under certain conditions, we have found it advisable to supplement the condenser cooling action of the above described air and water sprays with direct water cooling. In our improved condenser, this is accomplished by providing a plurality of water tubes 84 extending within and spaced concentrically from the vapor tubes 69 and connected between the water headers 65 and 68. Cooling water is supplied to these tubes 84 by means of a pipe 85 controlled by a valve 86 and connected to the lower water header 68, and the waste water is conducted from the upper header 66 to the drain 36 through the pipes 87 and 88. Steam from the ejector tube 46 enters the header 66 and flows into the concentric spaces between the tubes 69 and 84 where it is cooled and condensed by the air and water spray outside of the tubes 69, by the water within the tubes 84 or by the combined action of these cooling media. The condensate collects in the lower header 67 and is drawn off through the pipe 89 by the power driven pump 90 which delivers this condensate to the boiler B through the pipe 39, and, when required, to the evaporator container 50 through the pipe 91. The unevaporated spray water collects in the bottom of the condenser shell 64 and passes off through the pipe 49 connected with the drain 36.

The remaining apparatus will be described in connection with the operation of the system.

When the system is used to supply heat to the building, the valves 42 and 102 are closed and the valves 61 and 103 opened, thereby completing a steam circuit from the boiler B through the pipes 41 and 60, through the heating coil 59 in the evaporator container 50 and back through the pipe 62, the feed pump 90 and the pipe 39 to the boiler B. The water circulating system is connected through the control valve 96 and the evaporator container 50 by opening the valves 92 and 94 and closing the valve 105, and water is circulated through the system by the power driven pump 6. The by-pass pipe 10 is opened by the valve 104. Sufficient water is introduced to the circulating system so that with the pump 6 operating and with all the room radiators or heat exchangers filled, the evaporator container 50 is substantially half full of water. The steam in the heating coil 59 heats the circulating water and this heat is delivered to the rooms of the building through the radiators. The radiators may be individually adjusted to maintain the desired temperature conditions in each room. The condensed steam from the heating coil 59 is returned to the boiler B through the pipes 62 and 39 by the feed water pump 90.

In accordance with the invention, the heating and cooling action of the system are both controlled automatically in accordance with both the outside air temperature and the temperature of the water in the water circuit. In general, the control apparatus includes governing means, jointly responsive to both the outside air temperature and the temperature of the circulated water, acting to vary the rate of heat supply from the steam to the circulated water in inverse proportion to changes in the outside air temperature, and acting to vary the rate of steam supply to the ejector of the cooling apparatus in direct proportion to changes in the outside air temperature.

Various known electrically or mechanically operated thermostatic devices and operating means may be employed in our improved heating and cooling control combination, and, although in the illustrated embodiment we have shown devices of the pressure type acting directly on a valve operating bellows, it should be understood that other types of thermostats and operating devices may be employed.

Referring to the heating control, a three-way valve 96 governs the division of circulated water from the return pipe 8 between the pipe 9 leading to the container 50 and the heating coil 59, and the by-pass 10 around the water heating means. The operating arm 97 of the valve 96 is connected to suitable means, such as the bellows 98, capable of responding to the simultaneous action of a plurality of thermostatic devices. A thermostat bulb 99, responsive to the outside atmospheric temperature, and a thermostat bulb 100, disposed in contact with and responsive to the temperature of the water entering the supply pipe 7, are both connected through suitable tubes to the operating bellows 98. The arrangement of the valve operating means is such that an increase in pressure within the bellows 98, corresponding to a temperature rise, causes the valve 96 to reduce the flow of water to the pipe 9 and the heating means, and correspondingly increase the flow through the by-pass pipe 10 while a decrease in the bellows pressure caused by a temperature drop causes the valve 96 to deliver more water through the pipe 9 to the heating means and correspondingly cut down the water flow through the by-pass 10.

With the described arrangement, the rate of supply of heat to the circulated water is varied in inverse proportion to temperature changes. Thus increases in outdoor temperature and/or water temperature act to reduce the rate of heat supply to the circulated water, and drops in outdoor temperature and/or water temperature act to increase this rate of heat supply. At a constant indoor temperature, heat is lost from a building at a rate which varies inversely with the outdoor temperature, and accordingly, the control described anticipates and prevents indoor temperature variations resulting from outdoor tempeature changes. This control provides very steady indoor temperatures since it responds to and counteracts the outdoor temperature change before such change has materially altered the indoor temperature. The heat supply control is not solely dependent on the outside temperature, but is jointly governed by the outside temperature and the temperature of the circulated water. The two thermostats 99 and 100 are connected both to the bellows 98 and to each other, and accordingly, there is not only joint control of the rate of heat supply but in addition, each thermostat exerts a control on the other. This dual control prevents the wide fluctuations in indoor temperature which would result if outdoor temperature control only were employed. Thus, when the outdoor temperature drops considerably, the rate of heat supply would be increased beyond the required point if no other control was provided. The water temperature responsive control acts as a check on the outdoor temperature control and limits the water temperature increase to the required amount. Since the limiting control is responsive to the temperature of the circulated water, any overheating of the building rooms due to a time delay or lag between the water temperature and the room air temperature is avoided. The outdoor air temperature is the primary factor in controlling the circulated water temperature. Thus, although the circulated water temperature, as it rises, acts through the thermostat 100 to limit the rate of heat supply to the water, the temperature to which the water rises before this limit is reached is automatically dependent upon the outdoor temperature, and this because of the control exerted on the water thermostat 100 by the outdoor thermostat 99.

When it is desired to employ the system for cooling, the by-pass 10 in the water circulating system is closed by the valve 104, the valves 92 and 94 are closed and the valve 105 is opened, thus completing a water return circuit through the pipe 106 around the three-way valve 96 to to the pipe 9 and the evaporator container 50. Steam is cut off from the heater coil 59 by closing the valves 61 and 103 and is admitted to the ejector by opening the valve 42. The valve 102 in the condensate pipe 89 leading from the condenser C to the feed pump 90 is opened. The water circulating pump 6 is started and the condenser C is placed in operation by starting the blower 74 and opening the spray water supply valves 82 and 83.

The flow of steam to the ejector J is governed by an automatically operated throttle valve 43, the opening of which is governed by the bellows 98 through a suitable linkage, as shown. The connection between the bellows 98 and the throttle valve 43 is such that an increase in bellows pressure, corresponding to a rise in outdoor or water temperature, opens the throttle valve and increases the rate of steam supplied to the ejector, while a drop in bellows pressure, corresponding to a drop in outside air or circulated water temperature, closes the throttle valve and decreases the rate of steam supply. The rate of steam supply to the ejector is thus varied in direct proportion to changes in the outdoor temperature and the circulated water temperature. When the cooling operation of the system is initiated, the outside temperature, as well as the temperature of the water in the water circuit, is relatively high and the resultant action of the thermostats 99 and 100 moves the throttle valve 43 to its wide open position, thus admitting full steam pressure to the ejector nozzle 44. The ejector creates a very high vacuum in the evaporator container 50, and by employing proper ejector design, this vacuum may be high enough so that water will boil within the evaporator at temperatures as low as 40° F. The water entering the evaporator container 50 from the circulating system is at considerably higher temperature than the temperature at which water boils at the reduced pressure within this container. Accordingly, some of the water which falls in a spray from the distributing pan 51 and perforated plates 52 immediately boils and vaporizes. This boiling is necessarily accompanied by the absorption of heat, and since the only available heat source is the water itself, the water temperature is lowered.

The cooling of the water in the circuit continues until the required water temperature is obtained, at which point the thermostat 100, acting in conjunction with the thermostat 99 and thus in accordance with the outside temperature, lowers the pressure in the bellows 98 and thus cuts down the rate of steam supplied to the ejector nozzle 44. The reduction in steam supply lowers the vacuum produced in the evaporator container 50 and accordingly lowers the rate of cooling effected by raising the temperature at which water boils in the evaporator.

The thermostats 99 and 100 act to govern the degree of cooling in the same manner as that disclosed above in connection with the heating control. Thus the outdoor thermostat 99 exerts the primary control, varying the rate of steam supply and hence the rate at which heat is taken from the circulated water in direct proportion to changes in outdoor temperature. The circulated water thermostat 100 acts as a check on the control exerted by the outdoor thermostat 99, limiting the water temperature and preventing undue fluctuations thereof.

The exhaust steam and circulated water vapor from the ejector J is condensed in the condenser C and returned to the steam boiler as explained above. The float valve 54 maintains the desired water level in the evaporator container 50, replacing the water withdrawn from the circuit as vapor with water condensed in the condenser C. If the air and water spray cooling is insufficient to condense all of the vapor delivered to the condenser C, the valve 86 is opened and cooling water is passed directly through the tubes 84 located in the condensing tubes 69. If desired, drinking water may be circulated through the coil 63 in the evaporator E while the system is acting as a cooler.

Although in the disclosed embodiment, a single ejector is employed having a single nozzle therein and the rate of steam supplied to this nozzle is varied, it should be understood that the invention is not limited to this form of steam control. Thus a plurality of nozzles may be used in the ejector, or a plurality of single nozzle ejectors may be connected to the evaporator container, and the steam supply may be varied by varying the number of active nozzles. With the alternative arrangement suggested, full steam pressure may be maintained on each active nozzle.

Although a water circulating pump must be employed when the circulated water is cooled, it is possible, particularly in small building installations, to dispense with the pump and rely on thermo-siphonic or gravity action to circulate the water when the steam acts as a heater. A system adapted for either forced or gravity circulation of heated water and forced circulation of cooled water is shown in Figure 3. In this system, the steam coil 110 for heating the water is located in a separate water heating tank 111 and no steam heating coil is provided in the evaporator E'. The return duct 8' of the water circuit may be connected with the lower end of the tank 111 through the pipe 112, the pump 6' and the pipe 113. A by-pass pipe 114 extends around the pump 6' as shown. A three-way valve 115 controlled by the operating bellows 98' governs the division of circulated water between the heater tank 111 and the by-pass pipe 108 which is directly connected with the water supply pipe 7'.

When the system of Figure 3 is employed to heat the water, the valves 107, 109 and 116 are closed and the valves 117, 118, 119 and 120 are opened. The water circuit then runs from the return pipe 8' through the pipe 112 and the pump 6', divides at the three-way valve 116 and passes in parallel through the heater tank 111 and the by-pass pipe 108 to the supply pipe 7'. When conditions permit, the pump 6' may be shut down and the valve 121 in the by-pass pipe 114 opened, whereupon the water may be circulated through the system by thermo-siphonic action, the water rising in the tank 111 as it is heated.

The water cooling circuit through the apparatus of Figure 3 is completed by closing the valves 117, 121, 118, 119 and 120 and opening the valves 107, 109, and 116. The water circuit then runs from the return pipe 8' through the pipe 9' and the evaporator container 50', the pipe 122 and the pump 6', the pipes 123 and 108 to the supply pipe 7'.

The evaporator E, ejector J and the thermostatic control equipment disclosed in Figure 3 are of the same construction and operate in the same manner as the corresponding elements described above in connection with Figure 2. Accordingly, these parts will not be again described but are referred to with reference characters corresponding to those used in Figure 2 but with distinctive exponents. It will be noted that in the system of Figure 3, the bellows 98', the action of which is jointly responsive to the outside temperature thermostat 99' and the circulated water temperature thermostat 100', acts to operate both the steam valve 43' of the ejector J' and the three-way valve 115 of the hot water system. Any suitable connections may be employed to effect this operation and in the disclosed embodiment, we have shown a simple linkage including a bell crank lever 124. With the arrangement shown, expansion of the bellows 98' in response to temperature increases acts to cut down the amount of heat supplied to the circulated water by by-passing the water around the tank 111 through the pipe 108. Expansion of the bellows 98' corresponding to the temperature increase opens the throttle valve 43' and thus increases the amount of steam employed to effect cooling within the evaporator E'.

The system of the invention is highly efficient and well suited for many types of installations. The system avoids the use of refrigerant gases which are ordinarily toxic, inflammable or of otherwise objectionable nature. The absence of compressors and prime movers therefor insures the quiet operation of the system and also materially reduces the operating and maintenance costs and the capital investment involved. As the system employs the same source of steam and the same water circuit system for both heating and cooling, the major portion of the equipment is in substantially constant use.

Our system is suitable for installation in various building constructions such as houses, hospitals, office buildings, theaters, ships, etc., and in the appended claims, the term "building" is employed generically to include these and equivalent enclosures.

We claim:

1. In a water heating and cooling system, in combination with a building, a closed water circuit in the building and building room radiators connected in said circuit, a source of steam, means for at times employing steam from said source for heating the water in said circuit, means operated at other times by the steam from said source for cooling the water in said circuit and means responsive to the atmospheric temperature outside of said building for varying the rate of supply of heat to the water in inverse proportion to changes in outside temperature and for varying the rate of supply of steam to said cooling means in direct proportion to changes in outside temperature.

2. In a water heating and cooling system, in combination with a building, a closed water circuit in the building and building room radiators connected in said circuit, a source of steam, means for at times employing steam from said source for heating the water in said circuit, means operated at other times by the steam from said source for cooling the water in said circuit and means responsive to the temperature of the water in said circuit for varying the rate of supply of heat to the water in inverse proportion to changes in water temperature and for varying the rate of supply of steam to said cooling means in direct proportion to changes in water temperature.

3. In a water heating and cooling system, in combination with a building, a closed water circuit in the building and building room radiators connected in said circuit, a source of steam, means for at times employing steam from said source for heating the water in said circuit, means operated at other times by the steam from said source for cooling the water in said circuit and means jointly responsive to the atmospheric temperature outside of said building and the temperature of the water in said circuit for varying the rate of supply of heat to the water in inverse proportion to changes in the outside air temperature and for varying the rate of supply of steam to said cooling means in direct proportion to changes in the outside air temperature.

4. In a water heating and cooling system for buildings including a closed water circuit having room radiators and an evaporator connected in said circuit, a source of steam, means for utilizing steam from said source to create a partial vacuum in said evaporator whereby the water therein will boil at a relatively low temperature with absorption of heat from the unvaporized water therein, means for heating the water in said circuit by heat exchange with steam from said source, means controlling the flow of steam to said vacuum-producing means, and means controlling the exchange of heat from the steam to the water in the circuit, whereby the steam may either be used to cool or to heat the water in the circuit.

5. In a water heating and cooling system for buildings including a closed water circuit having room radiators and an evaporator connected in said circuit, means for maintaining a predetermined amount of water in said evaporator, a source of steam, means for utilizing steam from said source to create a partial vacuum in said evaporator whereby the water therein will boil at a relatively low temperature with absorption of heat from the unvaporized water therein, a heat exchanger located in the water in the evaporator, means for passing steam from said source through said heat exchanger to heat the water therein, means controlling the flow of steam to said vacuum-producing means, and means controlling the passage of steam through said heat exchanger, whereby the steam may either be used to cool or to heat the water in the circuit.

6. A water heating and cooling system for buildings including a closed water circuit having radiators and an evaporator connected to cool the water in said circuit, a source of steam, an ejector operated by steam from said source for creating a partial vacuum in said evaporator whereby the water therein will boil at a relatively low temperature with an absorption of heat from the unvaporized water therein, means for heating the water in said circuit by heat exchange with steam from said source, means controlling the flow of steam to said ejector, means controlling the exchange of heat from the steam to the water in the circuit, whereby the steam may either be used to cool or to heat the water in the circuit, means for condensing both the exhaust steam from said ejector and the water vapor evolved in said evaporator, and means for returning the condensate so obtained to said water circuit and to the steam-producing source.

HORACE L. SMITH, Jr.
LUCIAN N. JONES.